is

(12) United States Patent
Lu

(10) Patent No.: US 6,357,712 B1
(45) Date of Patent: Mar. 19, 2002

(54) PIVOT FOR A SCREEN

(76) Inventor: Sheng-Nan Lu, No. 174, Chunying St., Shulin Chen, Taipei Hsien (TW)

( * ) Notice: Subject to any disclaimer, the term of this patent is extended or adjusted under 35 U.S.C. 154(b) by 0 days.

(21) Appl. No.: 09/604,969

(22) Filed: Jun. 28, 2000

(51) Int. Cl.$^7$ .............................. A47F 5/00; A47H 1/00
(52) U.S. Cl. .................... 248/291.1; 248/185.1
(58) Field of Search ................. 248/918, 919, 248/921, 922, 923, 371, 397, 291.1, 292.12, 292.14; 361/681; 349/58–60; 403/116, 111, 87

(56) References Cited

U.S. PATENT DOCUMENTS

| | | | | |
|---|---|---|---|---|
| 683,439 | A | * 10/1901 | Cogger | 403/116 |
| 4,732,357 | A | * 3/1988 | Lindsay | 248/185 |
| 5,836,561 | A | * 11/1998 | Liao | 248/291.1 |
| 5,923,528 | A | * 7/1999 | Lee | 361/681 |

* cited by examiner

Primary Examiner—Leslie A. Braun
Assistant Examiner—Gwendolyn Baxter
(74) Attorney, Agent, or Firm—Fei-Fei Chao; Venable, Baetjer, Howard & Civiletti, LLP

(57) ABSTRACT

A pivot for a screen includes a base with two brackets extending upright from two opposite sides thereof. Two pivotal plates are respectively and pivotally connected with the two brackets. Each bracket has an annular guide way concentrically defined around a center thereof and a plurality of equal spaced positioning holes defined in each guide way. Each pivotal plate has a plurality of equal spaced receiving holes concentrically defined around a center thereof corresponding to the positioning holes of the brackets A plurality of balls is sandwiched between each mated set of brackets and plates, in the respective positioning and receiving holes thereof. The pivotal plates are able to be pivoted and positioned at a segmental position determined by the positioning holes.

9 Claims, 5 Drawing Sheets

PIVOT FOR A SCREEN

BACKGROUND OF THE INVENTION

1. Field of the Invention

The present invention relates to a pivot used to secure a screen, especially an LCD screen at different sites to enable the LCD screen to be pivoted and retained at a segmental position determined by positioning holes defined in the pivot.

2. Description of Related Art

Due to their light weight, LCD screens are widely used at different sites in various fields of life at present.

As shown in FIGS. 4 and 5, a conventional pivot for an LCD screen comprises a pivotal frame (40) pivotally connected with a base (41). Two opposite sides of the pivotal frame (40) are respectively defined with two pivot holes (42) corresponding to two holes (43) defined in opposite sides of the base (41). Each side of the pivot has a bolt (44) extended through the corresponding hole (43) of the base (41), the corresponding pivot hole (42) of the pivotal frame (40), a fixing ring (46), a plurality of elastic rings (45), and then a distal tip of the bolt (44) is fixed with a nut (47).

The fixing ring (46) has an extension (460) inserted in a retaining eye (49) defined in the base (41), whereby the pivotal frame (40) has a pivoting area thereof limited by the extension (460) of the fixing ring (46). The pivotal frame (40) is able to be pivoted and retained by friction between the elastic rings (45) and the pivotal frame (40).

When a user wants to change a positioning angle of the screen secure on the above described conventional pivot, the pivotal frame (40) is pressed to overcome the friction of the elastic rings (45). However, there is a problem that if the friction between the elastic rings (45) and the pivotal frame (40) is too large, a lot of force will have to be used, and if the friction between the elastic rings (45) and the pivotal frame (40) is too light, the screen may become loose and drop, possibly damaging it.

Therefore, it is an objective of the invention to provide an improved pivot for a screen to mitigate and/or obviate the aforementioned problems.

SUMMARY OF THE INVENTION

The object of the present invention is to provide an improved pivot for a screen, especially an LCD screen, which comprises a base with two brackets extending upright from two opposite sides thereof, a pair of pivotal plates respectively and pivotally connected with the two brackets. Each bracket has an annular guide way defined around a center thereof and a plurality of equal spaced positioning holes defined in the guide way. Each pivotal plate has a plurality of equal spaced receiving holes defined around a center thereof corresponding to the positioning holes of the brackets, whereby the pivotal plates are able to be pivoted and positioned at a segmental position determined by the positioning holes.

The detailed features of the present invention will be apparent in the detailed description with appropriate reference to the accompanying drawings.

DETAILED DESCRIPTION OF THE PREFERRED EMBODIMENT

Figure 1:
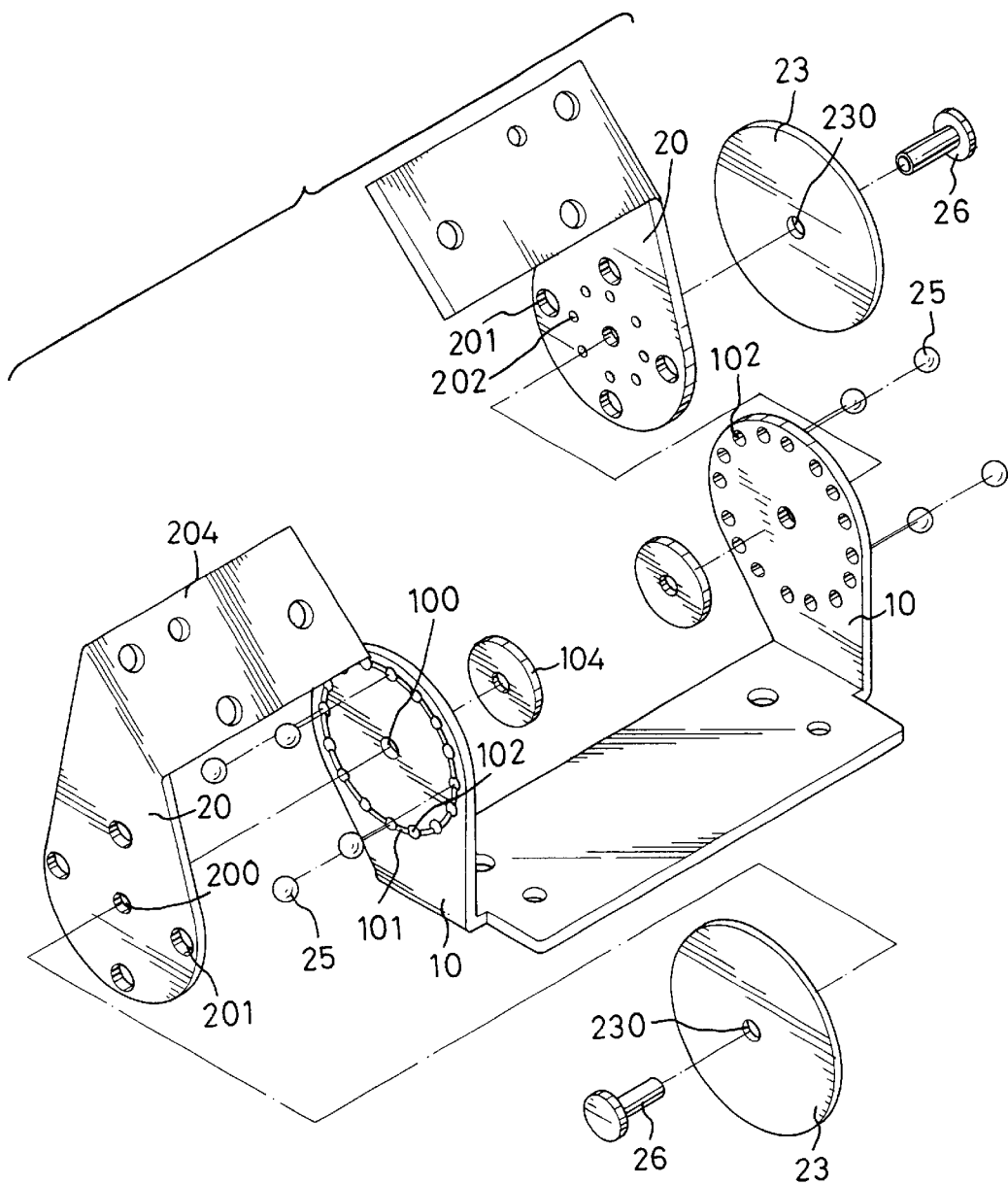
FIG. 1 is a perspective exploded view of a pivot of a screen in accordance with the present invention.
Figure 2:
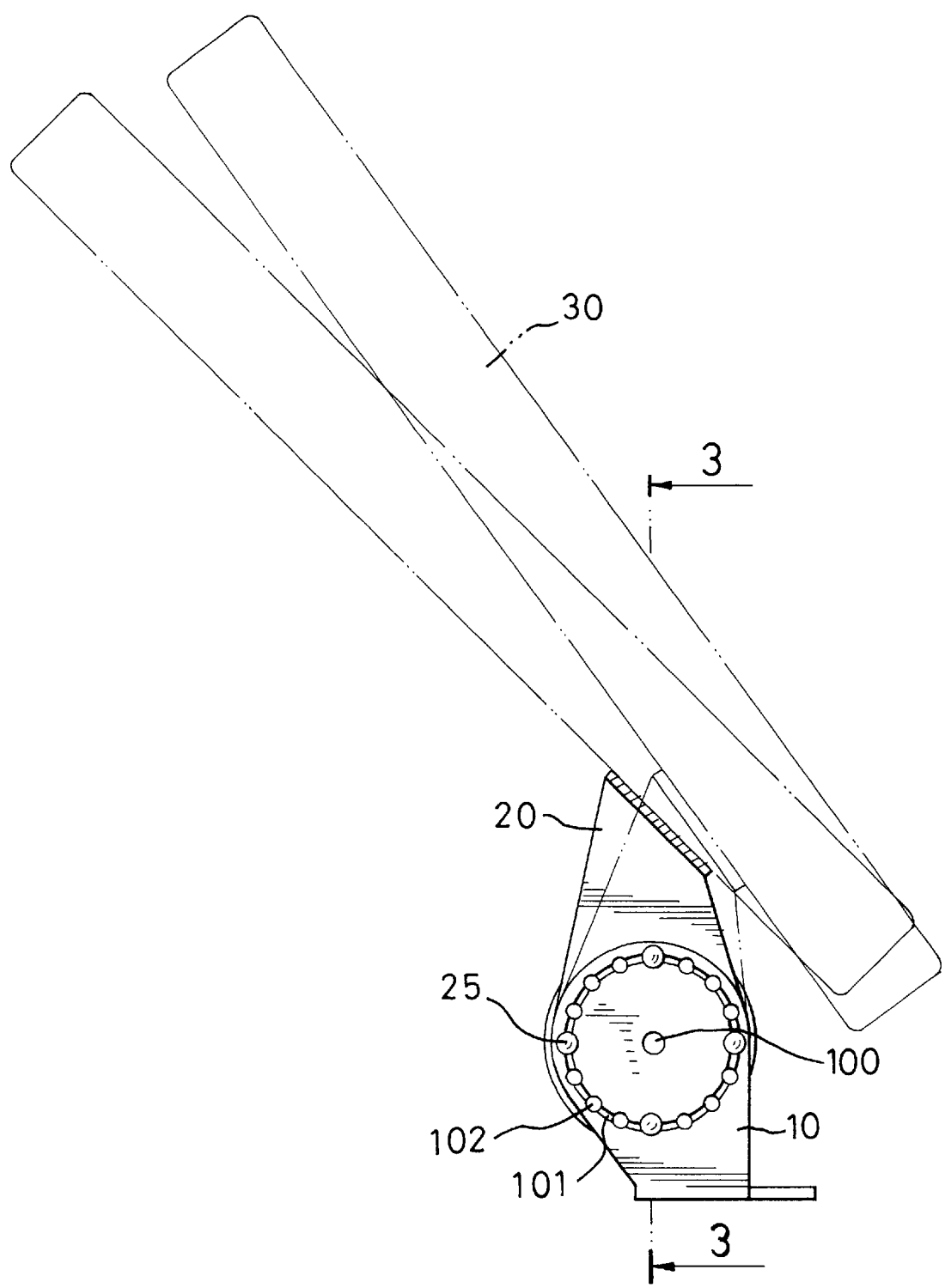
FIG. 2 is a part cross sectional view of the pivot of the screen in accordance with the present invention, along a line 2—2 in FIG. 3.
Figure 3:
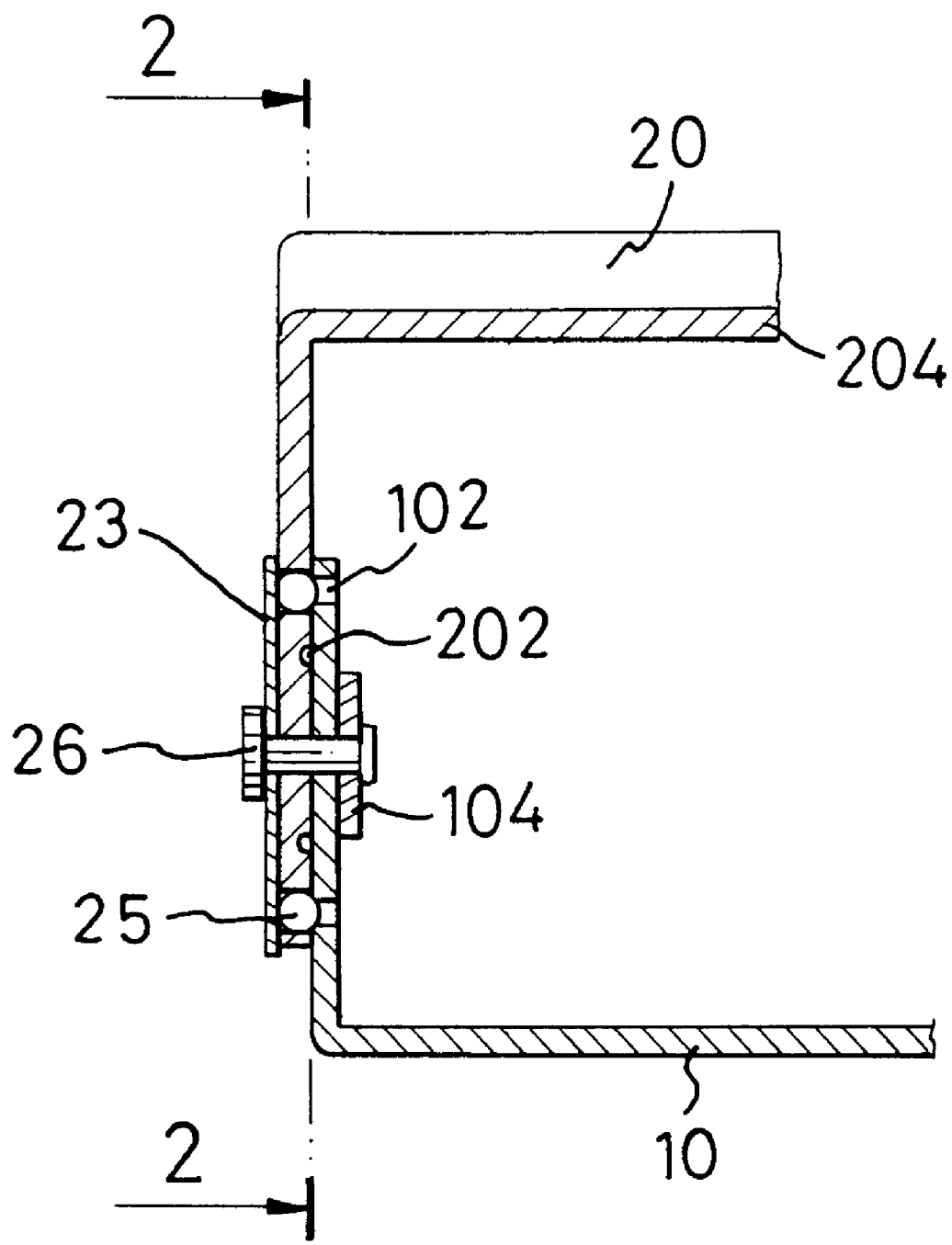
FIG. 3 is a cross sectional view of the pivot of the screen in accordance with the present invention, along a line 3—3 in FIG. 2.
Figure 4:
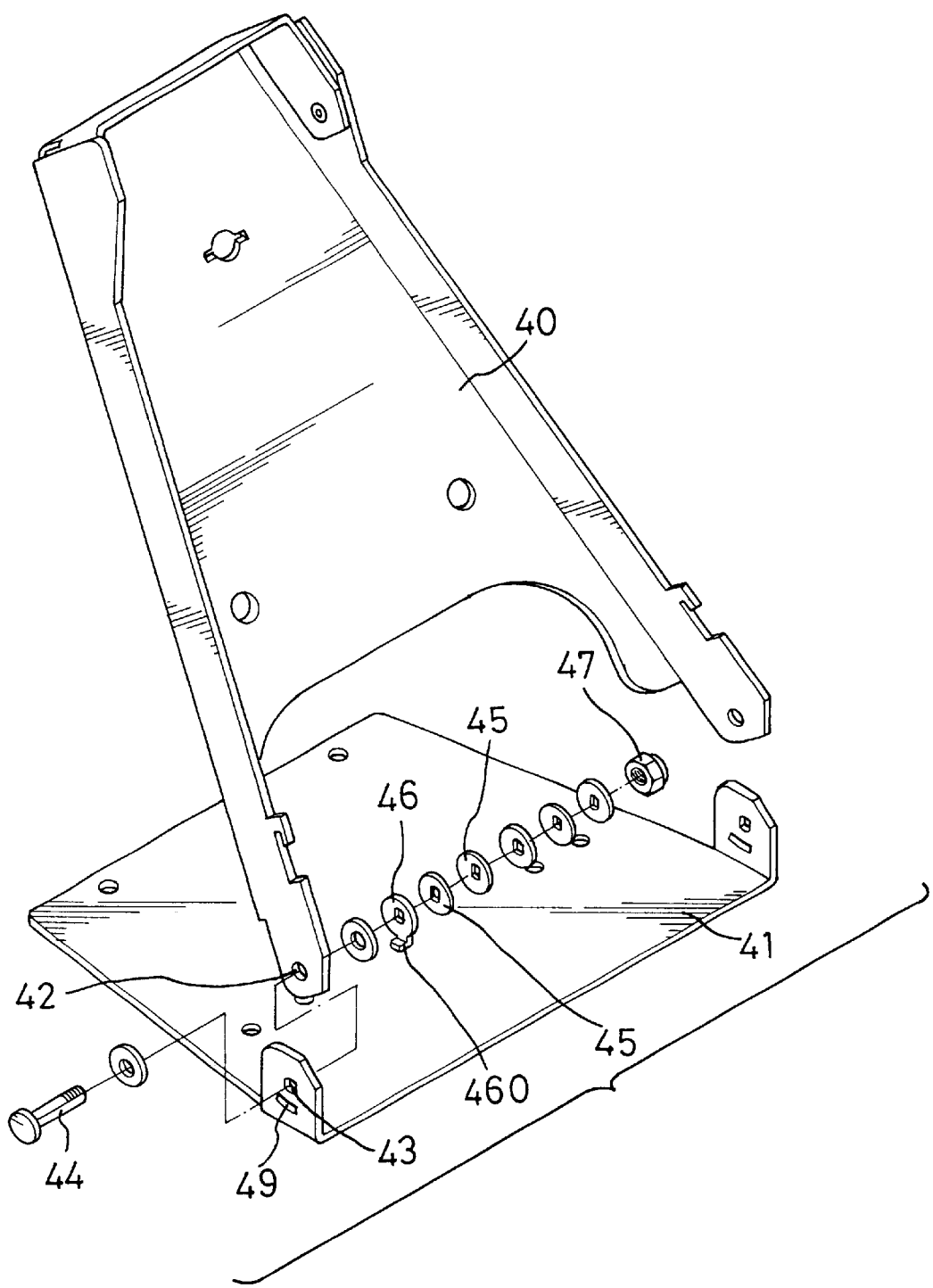
FIG. 4 is a perspective exploded view of a conventional pivot of screens.
Figure 5:
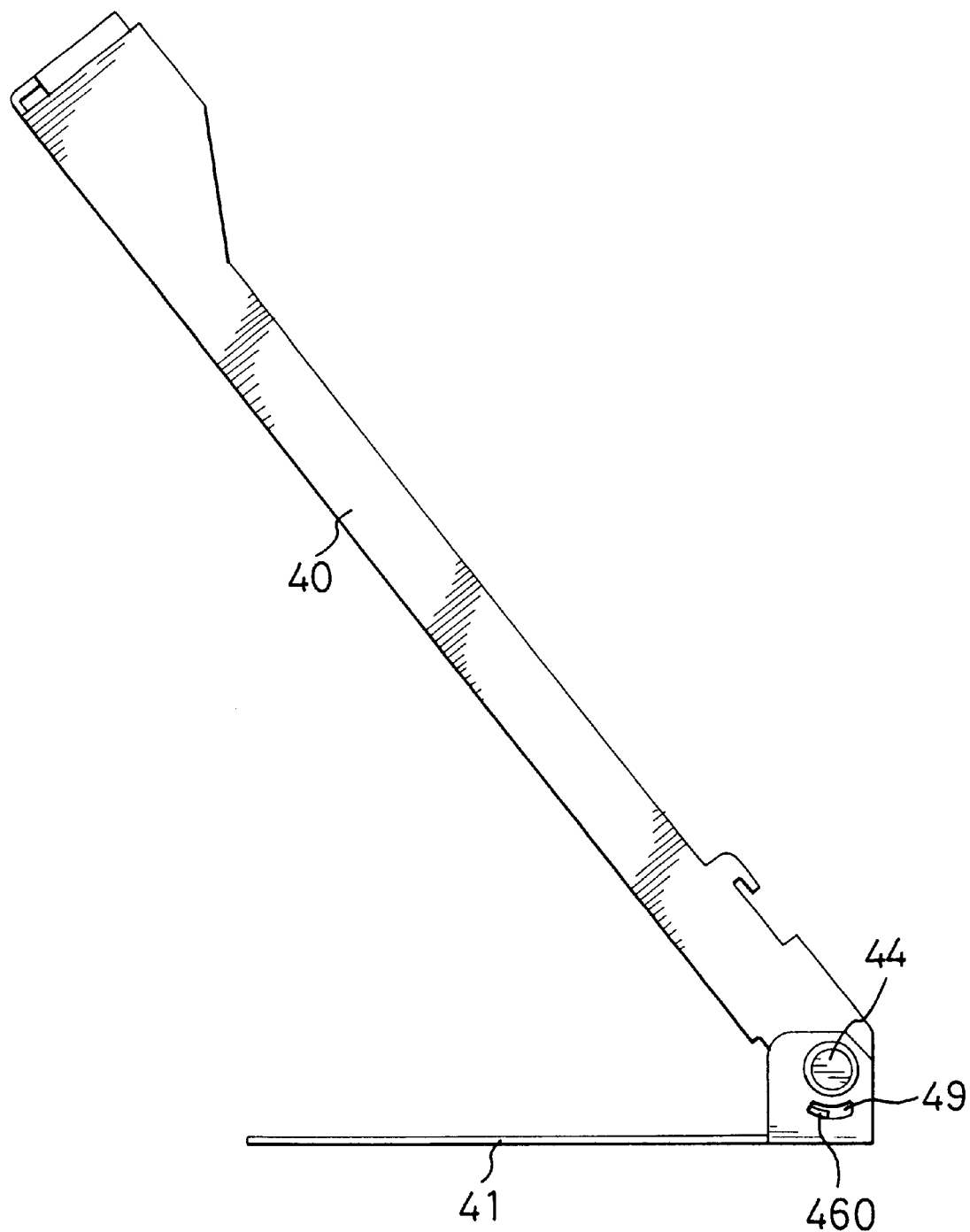
FIG. 5 is a side view of the conventional pivot of screens in FIG. 4.

As shown in FIGS. 1, 2 and 3, the present invention relates to a pivot for a screen, and especially an LCD screen. The pivot comprises a base with two brackets (10) extending upright from opposite sides thereof, and a pair of pivotal plates (20) respectively and pivotally connected with the two brackets (10). Although in the preferred embodiment, two brackets (10) and two pivotal plates (20) are employed, the invention is not necessarily restricted to that quantity. Each bracket (10) has a hole (100) defined in a center thereof, and an annular guide way (101) concentrically defined around the hole (100) and in an outer face thereof. A plurality of equal spaced positioning holes (102) is defined in each guide way (101).

Each pivotal plate (20) includes an arm (204) perpendicularly extending inward therefrom. Each pivotal plate (20) has a pivot hole (200) defined in a center thereof corresponding to the hole (100) of the respective bracket (10), and a plurality of equal spaced receiving holes (201) concentrically defined around the pivot hole (200) and corresponding to the positioning holes (102) of the bracket (10). Each receiving hole (201) has a ball (25) provided therein. In this embodiment the balls (25) are preferably made of steel, but any commonly-used material is also practical Two pressing plates (23) are respectively abutted against opposite outsides of the pivotal plates (20). Each pressing plate (23) is defined with an eye (230) in a center thereof corresponding to the hole (100) of the respective bracket (10) and the pivotal hole (200) of the respective pivotal plate (20). Two rivets (26) are respectively extended through the corresponding eyes (230) of the pressing plates (23), the pivot holes (200), the holes (100), and a respective one of two washers (104) to correspondingly fix the pressing plates (23) and the pivotal plates (20) with the brackets (10) of the base.

When a screen (30) secured on the arms (204) of the pivotal plates (20) is pivoted, the balls (25) will respectively slide along the guide way (101) from one positioning hole (102) to a following positioning hole (102), whereby the screen (30) is able to be positioned in segmental positions determined by the positioning holes (102).

To smooth the rotation of the LCD screen, inner surfaces of the pivotal plates (20) abutting the brackets (10) are respectively defined with a plurality of recesses (202) to receive a lubricant therein.

The quantity of the positioning holes (102) of the bracket (10) and the receiving holes (201) of the pivot plate (20) can be varied from model to model according to different LCD screens intended for use therewith. The quantity of the receiving holes (201) is increased for a heavy LCD screen (30), and reduced for a lightweight LCD screen (30).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pivot for a screen comprising a base with two brackets respectively extending from two opposite outsides thereof, and a pair of pivotal plates respectively and pivotally connected with the brackets of the base, wherein each bracket has a hole defined in a center thereof, an annular guide way concentrically defined in an outer face thereof and around the center thereof, and a plurality of equal spaced positioning holes defined in the guide way;

each pivotal plate having a pivot hole defined in a center thereof corresponding to the hole of the respective bracket, a plurality of equal spaced receiving holes defined around the center thereof corresponding to the positioning holes of the respective bracket, and each receiving hole having a ball provided therein;

two pressing plates respectively abutting against opposite outsides of the pivotal plates, each pressing plate having an eye defined in a center thereof corresponding to the hole of the respective bracket and the pivot hole of the respective pivotal plate; and two rivets respectively extended through the corresponding eyes of the pressing plates, the pivot holes of the pivotal plates and the holes of the brackets to fix the respective pressing plates and the respective pivotal plates with the respective brackets, whereby in assembly, the balls are rotatably sandwiched between respective matched sets of the pressing plates and the pivotal plates such that a screen secured to the pivotal plates can be securely yet movably retained in a variety of segmental positions.

2. The pivot for the screen as claimed in claim 1, wherein inner surfaces of the pivotal plates abutting against the respective brackets are each defined with a plurality of recesses to receive lubricant therein.

3. The pivot for the screen as claimed in claim 1, wherein each pivotal plate has a perpendicular arm extending therefrom to which a screen is secured.

4. The pivot for the screen as claimed in claim 1, wherein the balls are made of steel.

5. The pivot for the screen as claimed in claim 1, wherein distal tips of the rivets are respectively secured with one of two washers after having been extended respectively through the eyes of the pressing plates, the pivot holes, and the holes.

6. A pivot for a screen comprising:

a base with at least one bracket extending therefrom and defining a hole concentrically surrounded by a plurality of equal spaced positioning holes formed in a guide way;

at least one pivotal plate corresponding to the at least one bracket, defining a pivot hole corresponding to the hole, and a plurality of receiving holes which align respectively with the positioning holes;

at least one pressing plate corresponding to the at least one bracket and defining an eye corresponding to the hole;

a plurality of balls sized to be partially received in respective aligned pairs of the positioning holes and the receiving holes; and at least one retaining device through the corresponding eye, pivot hole and hole to press together the bracket, the pivotal plate, and the pressing plate, whereby the balls are rotatably sandwiched between the bracket and the pivotal plate such that the pivotal plate may be moved and retained incrementally relative to the base.

7. The pivot for the screen as claimed in claim 6, wherein the retaining device is a rivet with a head abutting an outer face of the pressing plate, a shank sequentially extending through the eye, pivot hole, and the hole, and a distal tip secured to a washer.

8. The pivot for the screen as claimed in claim 6, wherein the quantity of each of the bracket, the pivotal plate, the pressing plate, and the retaining device is two.

9. The pivot for the screen as claimed in claim 6, wherein the pivotal plate includes a perpendicular fixing arm to which a screen is attached.

* * * * *